Dec. 21, 1937. G. W. TALBERT ET AL 2,102,863
MANUFACTURE OF PARTIAL OXIDATION PRODUCTS
Filed Nov. 6, 1933
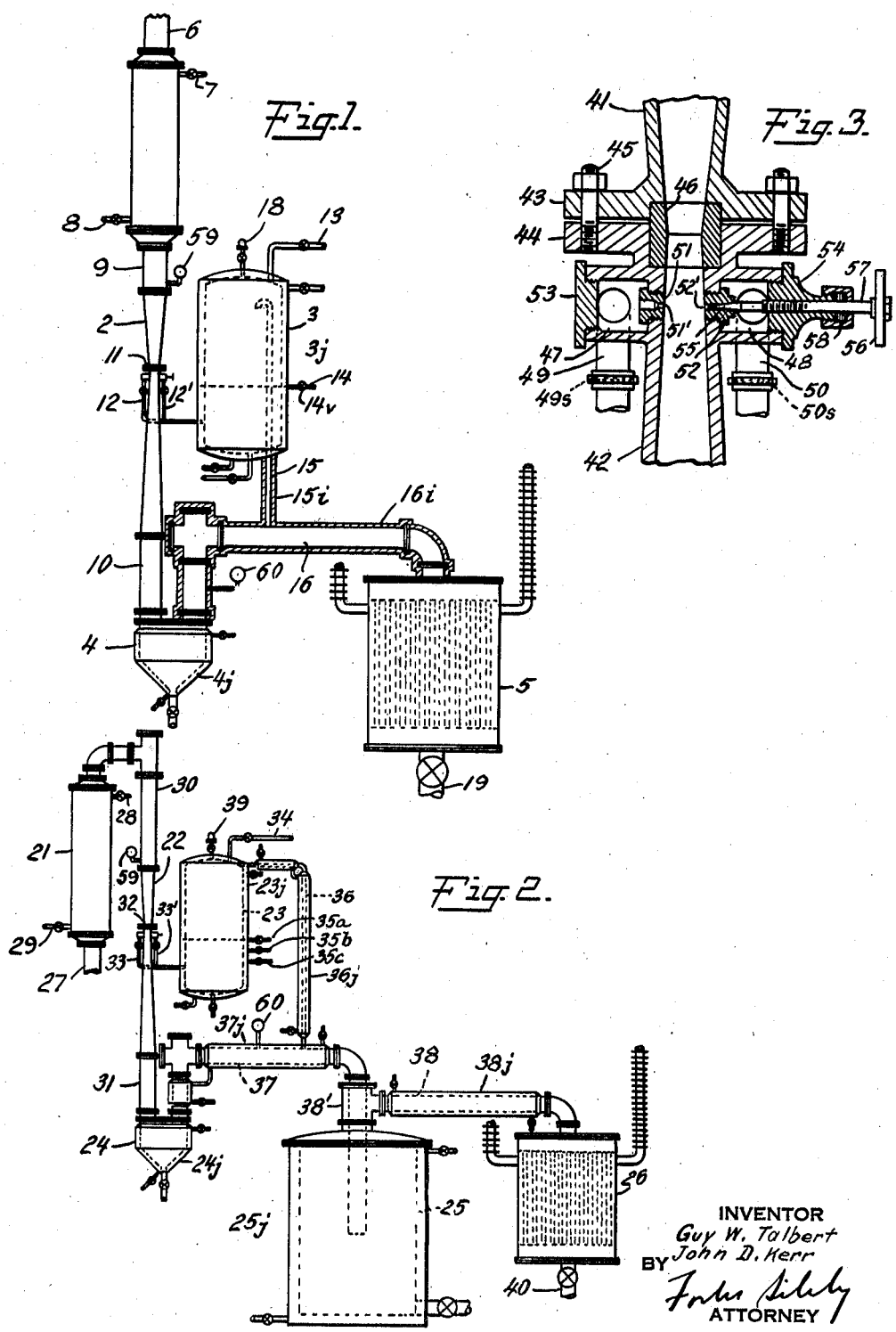
INVENTOR
Guy W. Talbert
John D. Kerr
BY
ATTORNEY Patented Dec. 21, 1937

2,102,863

UNITED STATES PATENT OFFICE 2,102,863

MANUFACTURE OF PARTIAL OXIDATION PRODUCTS

Guy W. Talbert, Summit, N. J., and John D. Kerr, Forest Hills, N. Y., assignors to National Aniline & Chemical Company, Inc., New York, N. Y., a corporation of New York Application November 6, 1933, Serial No. 696,802

8 Claims. (Cl. 260—123)

This invention relates to improvements in the manufacture of partial oxidation products of organic chemical substances, and especially of normally solid organic chemical substances, by a process which involves passing a vaporous reaction mixture containing the organic chemical substance in the vapor phase and an oxidizing gas in contact with an oxidation catalyst maintained at a suitable reaction temperature. It relates generally to an improved process and apparatus for forming the vaporous reaction mixture, and more especially to an improved process and apparatus for forming a mixture of vaporized naphthalene and air for use in the catalytic formation of phthalic anhydride.

The present invention has for an object improvements in the manufacture of partial oxidation products of organic chemical substances by catalytic processes of the type hereinbefore referred to, whereby uniform mixtures of normally solid vaporizable organic chemical substances and oxidizing gases may be obtained and consequently high yields and uniformity of the desired product may be secured.

A further object of the present invention is to provide a satisfactory and efficient apparatus for carrying out such improved processes.

Other objects of the invention will in part be obvious and will in part appear hereinafter.

The invention will be described as applied to the vapor phase catalytic oxidation of naphthalene with air for the production of phthalic anhydride. It is to be understood, however, that the invention is not limited thereto and that changes may be made in the details of the process and apparatus as well as in the materials treated, proportions of ingredients, order of steps, etc. within the scope of the appended patent claims.

In the vapor phase catalytic oxidation of naphthalene with air for the production of phthalic anhydride in accordance with one well known method, a mixture of air and naphthalene vapors is passed in contact with a catalyst maintained at a suitable reaction temperature; as for example, vanadium oxide associated with a suitable carrier and contained in tubes of small cross sectional area which are in indirect heat contact with a temperature controlling bath that is adapted to boil at a temperature suitable for maintaining the desired reaction temperature.

The proper formation of the vaporous reaction mixture employed in the oxidation entails considerable difficulty, owing to the nature of the material employed and the sensitivity of the reaction to changes in the composition of the reaction mixture and in the reaction conditions.

Thus, mixtures of naphthalene and air within certain ranges of proportions are likely to explode; it is therefore desirable for efficient and safe operation that the concentration of naphthalene in the air-naphthalene mixture supplied to the catalyst be known and/or controlled substantially at all times. To avoid operating within the explosive range of naphthalene-air mixtures while securing efficient utilization of the naphthalene, it is generally the practice to employ a relatively high ratio of air to naphthalene, as for example 25 parts to 30 parts by weight of air per part by weight of naphthalene. The reaction between naphthalene and air is moreover, highly exothermic, and is preferably carried out at a relatively high temperature (for example, in the neighborhood of 350° C. to 550° C.). In view of the relatively small size of the passages through which the vaporous reaction mixture travels in contact with the catalyst and the consequent high speed of passage, and further owing to the relatively high reaction temperature employed and the relatively small amount of naphthalene present at any instant, changes in the composition of the vaporous reaction mixture produce far reaching effects upon the catalytic reaction and consequently upon the quality and yield of the product (phthalic anhydride) obtained.

It has heretofore been proposed to provide a naphthalene vapor-air mixture, for use in the catalytic formation of phthalic anhydride, by providing a relatively large, shallow body of molten naphthalene and passing a stream of air over the surface thereof, whereby naphthalene vapors are sublimed and mixed with the air. This procedure has the disadvantage that uniformity of operation is difficult to secure. Unless a very pure naphthalene is employed, the composition of the vapor changes as the vaporization progresses, due to initial sublimation of the more volatile fractions of the body of molten material, with consequent change in the composition of the air-vapor mixture. The passage, furthermore, of such large quantities of air as are required for the production of vaporous mixtures of the desired concentration over a large surface of molten naphthalene renders exceedingly difficult maintenance of a uniform concentration of the air-vapor mixture.

It has also heretofore been proposed to form the naphthalene vapor mixture by passing a stream of heated air through a body of molten naphthalene under such conditions that the air is substantially saturated with naphthalene vapor at a known temperature, forming a primary air-naphthalene mixture, and then diluting the saturated air-naphthalene mixture with additional air. While this procedure is much superior to the above-mentioned procedure, in that only a part of the large quantity of air employed in the oxidation reaction is passed in contact with the molten naphthalene, so that more accurate control is obtainable, it has the disadvantage of requiring regulation and/or control of the temperature of the molten naphthalene, of the concentration of the primary air-naphthalene mixture, and of the amount of auxiliary air employed for producing the final vaporous reaction mixture. In addition, variations in the pressure in the system, as for example changes in the resistance of the catalyst mass to the flow of gas mixture therethrough, which variations are not transmitted to the primary air-vapor mixture and the auxiliary air stream in the proper ratio, cause variation in the concentration of the air-vapor mixture and consequently in the quality and yield of the product.

According to the present invention, regulation of the concentration of naphthalene in the naphthalene-air mixture is obtained by utilizing the flow of the air stream through the apparatus to control the introduction of the naphthalene into the mixture. We have found, according to the present invention, that many of the objections to the prior methods of forming the vaporous reaction mixture may be overcome and other highly desirable advantages may be secured by employing the so-called "venturi" or similar effect, for example that which results from the flow of a fluid through a graduated constriction of the "Venturi" type in a conduit, to supply the naphthalene to the air stream. Inasmuch as the reduction in pressure which occurs at the throat of a Venturi pipe varies in accordance with variations in the speed of flow of the air stream through said pipe, it is possible, in accordance with the present invention, to maintain a substantially uniform ratio of naphthalene to air in the vaporous reaction mixture, notwithstanding variations in the rate of flow of the air stream through the system.

The invention accordingly comprises the steps and their relation, and the apparatus having the features of construction and combination and arrangement of parts adapted to carry out said steps, which will be illustrated in the process and apparatus hereinafter disclosed. The scope of the invention will be indicated in the appended patent claims.

In the conversion of naphthalene to phthalic anhydride by catalytic oxidation in the vapor phase with air, in accordance with one feature of the present invention, the vaporous or gaseous reaction mixture is produced by passing a stream of air through a zone of high velocity in such a manner as to create a suction in said zone, which suction is sensitive to pressure variations in said air stream, and liquid naphthalene is introduced into said zone in a quantity proportionate to the quantity of gas passing through said zone. In accordance with another feature of the present invention, the stream of air is passed first through a zone of high velocity and low pressure, and second through a zone of low velocity and high pressure, and liquid naphthalene is introduced into the low pressure zone under a pressure varying with and regulated by the pressure in said high pressure zone. In accordance with a further feature of the present invention, the stream of air is passed through a conduit under suitable pressure to provide the desired flow through the system (which will be referred to herein as the "normal" gas pressure), a reduction in pressure of said air stream is produced in a zone of said conduit by the flow of said air stream therethrough, and liquid naphthalene is drawn into the air stream by the reduction in pressure thereby produced.

In the practice of the present invention in accordance with a preferred method of procedure, a stream of air, heated to a temperature above the melting point of naphthalene, is passed through a conduit leading to a catalytic converter containing a catalyst adapted to bring about the oxidation of naphthalene to phthalic anhydride, which conduit contains a Venturi constriction or other suitable means for producing a reduction in pressure by the flow of the air stream through said conduit, and naphthalene in molten condition is drawn into said air stream through a calibrated orifice by the reduction in pressure resulting from the flow of said air stream through said Venturi constriction. It will accordingly be understood that where a conduit having a Venturi pipe therein is referred to in the appended claims it is intended to include any conduit having a restricted cross-section in a zone thereof whereby on passing a stream of gas through the conduit a Venturi effect in the gas stream is produced. In order to render the supply of naphthalene substantially independent of external conditions, the naphthalene is maintained under a pressure substantially the same as that prevailing in the conduit leading from the venturi to the catalytic converter inlet; as for example, by maintaining a body of molten naphthalene in a closed vessel at a relatively constant surface level and controlling the pressure on the surface of said body of naphthalene so as to have it correspond substantially with the pressure prevailing in the conduit between the venturi and the catalytic converter inlet (herein referred to as the pressure of the resulting gaseous reaction mixture). The surface level of the body of molten naphthalene is preferably maintained at a point below that at which the naphthalene is introduced into the venturi, so that the naphthalene is drawn into the air stream substantially solely by the reduction in pressure produced by the flow of the air stream through the Venturi zone of the conduit.

The invention will be further described in connection with the accompanying drawing in which Fig. 1 diagrammatically represents one form of apparatus for carrying out the invention;

Fig. 2 illustrates a somewhat different apparatus for carrying out the invention; and Fig. 3 is a vertical section of a Venturi tube employed in the practice of the invention, showing details of its construction.

The apparatus illustrated in Fig. 1 comprise a preheater 1, a Venturi tube 2, a supply tank 3, a separator 4, and a catalytic converter 5.

The preheater 1 shown in the drawing is provided with a suitable gas inlet 6 and is adapted to effect the heating of the gas by indirect heat exchange with steam, suitable means such as steam inlet 7 being provided for the introduction of steam. A drawoff 8 is shown for withdrawing steam and/or condensate. A gas conduit 9 leads from the preheater 1 to the Venturi tube 2.

This conduit may be lagged or jacketed, if desired.

The Venturi tube 2 is provided with a gas passage therethrough from the inlet conduit 9 to a conduit 10 leading to the separator 4, and has intermediate of these conduits a throat 11. Conduits 12 and 12' provide communication from the liquid supply tank 3 to the interior of the Venturi tube at a point at or near the throat 11 thereof.

The liquid supply tank 3 is shown as a closed vessel provided with a suitable inlet 14 for supplying liquid naphthalene. The inlet 14 may be connected with any suitable source of liquid and the level of liquid in the tank may be regulated in any suitable manner, as by manual control of the valve 14v. The inlet 14 is preferably connected with a suitably heated constant-level liquid feed of the well-known type adapted to maintain the liquid in the tank 3 at a substantially constant surface level. If desired, an auxiliary liquid supply 13 may be provided. A steam jacket 3j or other suitable heating or insulating means may be supplied for maintaining the liquid in the supply tank in a heated condition where such is desirable. A valved vent 18 to the atmosphere may also be provided for opening the tank 3 to the atmosphere if desired.

The separator 4 may be of any suitable construction for removing suspended matter from the gases or gas and vapor passing therethrough. A centrifugal separator or electrical precipitator, for example, may be used for this purpose. In the separator illustrated in the drawing the gases or gas and vapors enter through conduit 10 and leave through a conduit 16. A steam jacket 4j having a suitable steam inlet and a drawoff is provided for avoiding heat losses or a temperature drop in this unit of equipment.

Conduit 16, which leads from the separator 4 to the catalytic converter 5, is connected by means of an equalizer pipe 15 to the supply tank 3 at a point above the liquid level in said tank. By this means the liquid in the supply tank may be maintained at substantially the same pressure as prevails in conduit 16 and variations in pressure in the latter immediately transmitted to the liquid in the supply tank. Both the equalizer pipe 15 and the conduit 16 have been illustrated as being suitably lagged with insulation 15i and 16i. If desired, these pipes may be jacketed or, where maintenance of high temperatures either is not necessary or may be obtained in another manner the lagging may be dispensed with.

Converter 5, of well known construction, is adapted to contain a suitable catalyst for carrying out the oxidation process and is provided with a valved outlet 19 for the withdrawal of reaction products while maintaining desired pressure conditions in the catalytic converter.

The apparatus illustrated in Fig. 2 comprises a preheater 21, a Venturi tube 22, a supply tank 23, separators 24 and 25, and converter 26.

The preheater 21 is provided with a gas inlet 27. As illustrated the preheater may employ steam as a heating medium, suitable means being provided for bringing the steam into heat exchange relation with the gas in its passage through the preheater. For this purpose a steam inlet 28 and drawoff 29 are shown for introducing steam and for withdrawing steam and/or condensate. A gas conduit 30 leads from the preheater 21 to the Venturi tube 22. This conduit may be lagged or jacketed, if desired.

The Venturi tube 22 is provided with a gas passage therethrough from the conduit 30 to a conduit 31 leading to the inlet of the separator 24, and has intermediate of these conduits a throat 32. Conduits 33 and 33' are adapted to conduct liquid from the supply tank 23 to suitable inlets or orifices in the venturi at or near the throat 32 thereof.

The liquid supply tank 23 is provided with a liquid inlet 34 as well as outlet conduits 33 and 33'. Suitable devices, such as test cocks 35a, 35b and 35c permit the determination of the liquid level in the supply tank. A valved vent 39 may also be provided for opening the tank to the atmosphere if desired. A steam jacket 23j may be employed for maintaining the liquid in the supply tank in a heated condition.

The separator 24 may be of any suitable construction for removing suspended matter from the gases or gas and vapor passing therethrough. In the separator illustrated in the drawing, the gases or gas and vapor enter through conduit 31 and leave through a conduit 37. A steam jacket 24j having a suitable steam inlet and a drawoff is provided for avoiding a temperature drop in the separator.

Conduit 37 leads to the settling chamber or separator 25 wherein further removal of suspended matter may be effected. This separator is likewise provided with a suitable steam jacket 25j. The conduit 37 is connected by means of an equalizer pipe 36 to the supply tank 23 at a point above the liquid level in said tank. In this way the liquid in the supply tank may be maintained under substantially the same pressure that prevails in conduit 37 and variations of pressure in this conduit immediately transmitted to the liquid in the supply tank.

A condut 38 connected with the separator 25 by an annular passage 38' leads to the converter 26. The conduits 37 and 38 as well as the equalizer pipe 36 have been shown as being provided with suitable steam jackets 37j, 38j, and 36j. It will be understood, of course, that under certain conditions these may be dispensed with if so desired or suitable lagging may be substituted.

The converter 26 is of well-known construction and contains a suitable oxidation catalyst. It is provided with suitable valved outlet means 40 for withdrawal of the reaction products of the catalytic conversion.

Fig. 3 illustrates a preferred type of Venturi tube, for use in the preferred process of this invention, having a tapered inlet portion 41 and a tapered outlet portion 42 which are provided with flanges 43 and 44 cooperating to form a union between these two portions of the Venturi tube. The flanges may be suitably drilled and secured by stud bolts 45 or other suitable securing means. Internally of the tubes, at the intersection of the tapered walls, a portion is cut away to admit an annular sleeve 46. The sleeve 46 is designed to fit smoothly into the venturi so that no appreciable roughness of the walls occurs. This sleeve 46 also serves to properly align the two tapered members 41 and 42.

Adjacent the constricted portion of the Venturi tube, the member 42 is provided with two wells or chambers 47 and 48. The wells are provided with pipes 49 and 50 adapted to connect them with the supply tank. The wells are also provided with orifice plates 51 and 52 having orifices 51' and 52' communicating with the interior of the Venturi passage at a point slightly toward the outlet side thereof from the maximum constriction of the throat. The orfice plates are advantageously separate members which may be screwed into the walls of the Venturi tube and constitute replaceable units. The wells 47 and 48 are provided with plugs 53 and 54 to provide access to the orifice plates 51 and 52, for cleaning, replacement, etc. The pipes 49 and 50 are provided with screens 49s and 50s to remove solid material which might plug the orifices. The screens may be of any suitable type, as for example, standard removable suction and pressure strainers of about 100 mesh, such as are ordinarily used in pipes to remove sediment.

A needle valve 55 threaded into the plug 54 and having an adjusting knob 56 is provided to control the flow of liquid through the orifice 52'. The valve stem 57 of the needle valve is suitably packed by the gland 58 to prevent leakage during operation. The orifice 52' is preferably somewhat larger in diameter than the orifice 51' so that the flow of liquid into the venturi is controllable within wide limits.

The venturi is preferably constructed of brass, while the sleeve 46 and the orifice plates 51 and 52 may avantageously be stainless steel. The interior walls of the venturi may be finished smooth after assembly so that no roughness occurs at the points where these fittings are inserted.

In the operation of the apparatus shown in Fig. 1, as applied to the catalytic oxidation of naphthalene to phthalic anhydride in accordance with one method of operation, air under suitable pressure for passing the vaporous reaction mixture through the system, including the catalytic converter (for example, air at a gauge pressure of about 30 pounds per square inch for use in connection with a converter operating at a gauge pressure at the exit thereof of about 22 pounds) is admitted from a suitable source to the inlet of preheater 1 in which it is heated to a suitable temperature adapted to provide vaporization of naphthalene, as for example, about 150° to about 160° C. Naphthalene in a molten condition is supplied to the tank 3 in such quantities as to maintain a substantially constant level of liquid in said tank.

The preheated air enters the Venturi tube and, passing through the throat 11 thereof, creates a suction which draws naphthalene through the conduits 12 and 12' from the supply tank 3. The turbulence resulting from the flow of the air stream through the Venturi throat results in rapid and efficient mixing of the naphthalene and heated air as well as assisting in rapid vaporization of the naphthalene.

In the usual operation, the flow of naphthalene through tube 12' is regulated by a suitable valve, such as needle valve 55. Ordinarily this valve is closed except at the beginning of the process when a reaction mixture rich in naphthalene is desired in order to get the temperature in the converter 5 up to the desired point. After the process is well started, the naphthalene is ordinarily fed to the Venturi tube solely through supply pipe 12, the quantity being regulated by the orifice 51'. Preferably the level of naphthalene in tank 3 is maintained substantially constant at a point about 2 to about 8 inches below the orifices 51' and 52'.

The air-naphthalene mixture passes from the Venturi tube into the separator or tar extractor 4 where suspended matter is removed. It then passes through the conduit 16 to the converter 5, preferably without substantial reduction in temperature. In the converter 5 the mixture is passed in contact with the catalyst which is suitably heated to cause the oxidation of naphthalene and its conversion to phthalic anhydride. The reaction product is withdrawn at outlet 19.

The quantity of naphthalene drawn in and mixed with the air will vary, of course, depending on the design of the apparatus, the pressure conditions existing in the system, etc. As an example, we may consider a Venturi tube having a diameter of $6\frac{1}{8}$ inches at the ends, a diameter at the throat of $1\frac{1}{32}$ inches, a length of $80\frac{1}{4}$ inches (the lengths of the tapered inlet and outlet portions being 25 inches and $55\frac{1}{4}$ inches respectively) and provided with a naphthalene inlet orifice 51' of $\frac{1}{8}$ inch diameter at a distance of $1\frac{31}{32}$ inches below the maximum constriction. Under the conditions above set forth (that is an air supply at about 30 pounds gauge pressure and a catalytic converter operating at a gauge pressure of about 22 pounds at the exit thereof) about 3,000 pounds of air may be passed through the system per hour. Under these conditions, the gauge pressure on the discharge side of the venturi, or in conduit 16, will be about 28 to 28.5 pounds. Thus there will be a pressure differential of about 1.5 to about 2 pounds between the intake side and the discharge side of the venturi. Such an apparatus operating under the specified conditions will maintain a supply of 100 pounds of molten naphthalene through the orifice 51' solely by the suction created by the air in passing through the venturi, giving a weight ratio of 30 to 1 of air to naphthalene.

By maintaining the surface level of molten naphthalene in supply tank 3 at a substantially constant level not substantially above the orifice 51', a substantially constant ratio of naphthalene to air is secured; notwithstanding the fluctuations in the operation, temperature, speed of gas flow, pressure and the like which ordinarily occur in the manufacture of phthalic anyhydride by vapor phase catalytic oxidation of naphthalene.

The equalizer 15 automatically and rapidly maintains the naphthalene in supply tank 3 at substantially the pressure prevailing in conduit 16, so that the effect of ordinary pressure variations occurring in the system on the naphthalene supply is substantially eliminated; and by maintaining a constant surface level of naphthalene in the tank 3 at or below the level of the orifice 51', the naphthalene is drawn into the venturi 2 solely by the venturi effect produced by the flow of air through it. If desired, the naphthalene in the tank 3 may be maintained at a constant level at or above the orifice 51'; but in that event the hydrostatic head of liquid naphthalene becomes a factor in its supply, and naphthalene may be introduced into the system even if no air is flowing through the venturi 2. To avoid such a result, which may lead to dangerous operating conditions, the naphthalene is preferably maintained in tank 3 at a surface level about 2 inches below the level of orifice 51'.

For delivery of the same weight of air per hour through the venturi, it is evident that the converter may be operated at other pressures within the limits of the air supply pressure; since a lowering of the pressure in the converter merely effects a reduction of the pressure on the discharge side of the venturi and a consequent reduction of pressure on the intake side of the venturi, which change is transmitted to the naphthalene in the tank 3 by the equalizer

15. If the converter 5 is operated at such a low pressure that the pressure on the discharge side of the venturi is say 12 to 14 pounds per square inch (or about atmospheric pressure), the equalizer 15 may be eliminated and the vent 13 may be opened to the atmosphere. Even under the latter conditions, naphthalene will be drawn into the air stream by the suction produced in the venturi, although of course not necessarily at the same ratio of air to naphthalene as in the above example. However, in the catalytic conversion of naphthalene to phthalic anhydride, operation at such relatively low pressure is not ordinarily desirable since it diminishes the output of the converter and otherwise affects the process. Discharge pressures in the venturi greater than about 12 to about 14 pounds per square inch generally require the use of the equalizer 15, or other suitable means for maintaining pressure on the naphthalene supply during the operation of the apparatus shown, and preferably at substantially the pressure prevailing in the conduit 16.

The operation of the apparatus shown in Fig. 2 is carried out in a similar manner. Thus, preheated air is passed from the preheater 21, at a temperature for example, of about 150° to about 160° C., through the Venturi pipe 22. The reduction in pressure caused by the passage of the preheated air through the Venturi pipe 22 serves to draw molten naphthalene from the supply tank 23 into the preheated air through the conduit 33 or conduits 33 and 33'. The resulting vaporous reaction mixture is passed through separator 24 and then through conduit 37 to settling chamber 25, wherein more complete removal of tar and other suspended matter is effected. The resulting cleaned vaporous reaction mixture containing naphthalene vapor and air then passes into catalytic converter 26 where it is contacted with a suitable catalyst (as for example vanadium oxide associated with a carrier) under reaction conditions adapted for the production of phthalic anhydride and the resulting reaction mixture is withdrawn from the converter through the outlet 40. As in the case of the apparatus shown in Fig. 1, the pressure on the naphthalene contained in supply tank 23 is maintained at substantially the same pressure as prevails in the conduit 37 by the equalizer 36.

The process and apparatus of the present invention possess manifold advantages as compared with those heretofore employed. Inasmuch as the introduction of naphthalene in the preferred practice of the invention depends solely upon the quantity of air passing through the system a definite ratio of naphthalene to air may be maintained notwithstanding fluctuations in the operation and conditions of the process. Since the quantity of liquid naphthalene introduced into the gas stream depends on the pressure at the point of introduction and the pressure applied to the liquid, variations in pressure of the gas stream result in a corresponding variation in the rate of introduction of the naphthalene. Consequently the adverse effect of such variations is in large part compensated and a greater uniformity of composition of the resultant gas mixture is obtainable than by previous methods of operation. The process and apparatus, moreover, are simpler to control, less troublesome to operate, and are more certain in their maintenance of the desired ratio than those heretofore employed. As a result, greater uniformity in the quality and yield of phthalic anhydride are obtained.

While the invention has been specifically described in connection with the production of phthalic anhydride by the catalytic oxidation of naphthalene in the vapor phase, as has been noted, the invention is not limited thereto but may be generally applied to other processes for the manufacture of partial oxidation products of organic chemical substances by catalytic oxidation in the vapor phase. Thus, the process and apparatus of the present invention may be employed for the production of partial oxidation products by employing molten anthracene, phenanthrene, acenaphthene, acenaphthalene, fluorene or other vaporizable normally solid organic chemical substances instead of naphthalene. Other oxygen-containing and/or oxidizing gases may be employed instead of air.

Suitable temperature and pressure gauges may, of course, be provided for the apparatus of our invention in order to ascertain the conditions in various portions of the apparatus. We have found it desirable, for example, to provide pressure gauges 59 and 60 at the inlet and near the outlet of the Venturi tube in order to assure proper regulation of the pressure conditions in this unit of the apparatus.

In the above description of one method of operating the process and apparatus of our invention, the prevailing pressures have been set forth in terms of gauge pressure. However, the pressures existing in the various zones of the system need not always be maintained at a positive gauge pressure to come within the purview of our invention. Reference to pressures as high pressures and low pressures is purely relative and pressure as used in the appended claims refers not to gauge pressure but to absolute pressure. As is well known the pressure and velocity head of a fluid undergoes wide variation in passing from the inlet to the throat of a venturi and from the throat to the outlet thereof. The fluid in the zones in proximity to the inlet and outlet is at comparatively high pressure and correspondingly low velocity while in the restricted area at or near the throat there is created a low pressure zone in which the fluid travels at high velocity. In the claims these zones have accordingly been referred to for convenience as zones of low velocity and high pressure, and a zone of high velocity and low pressure, respectively.

We claim:

1. In the conversion of a normally solid organic vaporizable substance to partial oxidation products by catalytic oxidation in the vapor phase with an oxygen-containing gas, the method of forming a vaporous reaction mixture of the oxygen-containing gas and vapors of said substance which comprises passing a stream of the oxygen-containing gas through a Venturi pipe, maintaining a body of said substance in molten condition, drawing said substance from said body into said stream of oxygen-containing gas by the suction created by said stream in passing through said Venturi pipe and forming a vaporous reaction mixture, maintaining the surface level of said body substantially constant, and maintaining a substantially constant pressure on said body of said substance.

2. In the conversion of a normally solid organic vaporizable substance to partial oxidation products by catalytic oxidation in the vapor phase with an oxygen-containing gas, the method of forming a vaporous reaction mixture of the oxygen-containing gas and vapors of said substance which comprises passing a stream of the oxygen-containing gas through a Venturi pipe, maintaining a body of said substance in molten condition, drawing said substance from said body into said stream of oxygen-containing gas by the suction created by said stream in passing through said Venturi pipe and forming a vaporous reaction mixture, maintaining the surface level of said body substantially constant at a point not substantially above the point at which said substance is introduced into said stream of oxygen-containing gas and maintaining a substantially constant pressure on said body of said substance.

3. In the conversion of a normally solid organic vaporizable substance to partial oxidation products by catalytic oxidation in the vapor phase with an oxygen-containing gas, the method of forming a vaporous reaction mixture of the oxygen-containing gas and vapors of said substance which comprises passing a stream of the oxygen-containing gas through a Venturi pipe, maintaining a body of said substance in molten condition, drawing said substance from said body into said stream of oxygen-containing gas by the suction created by said stream in passing through said Venturi pipe and forming a vaporous reaction mixture, maintaining the surface level of said body not substantially above the point at which said substance is introduced into said stream of oxygen-containing gas, and maintaining a pressure on said body of said substance substantially corresponding with the pressure of the resulting vaporous reaction mixture.

4. In the conversion of naphthalene to phthalic anhydride by catalytic oxidation in the vapor phase with an oxygen-containing gas, the method of forming a vaporous reaction mixture of the oxygen-containing gas and vapors of naphthalene which comprises passing a stream of the oxygen-containing gas through a Venturi pipe, maintaining a body of naphthalene in molten condition, drawing naphthalene from said body into said stream of oxygen-containing gas by the suction created by said stream in passing through said Venturi pipe and forming a vaporous reaction mixture, maintaining the surface level of said body substantially constant, and maintaining a pressure on said body of naphthalene substantially corresponding with the pressure of the resulting vaporous reaction mixture.

5. In the conversion of naphthalene to phthalic anhydride by catalytic oxidation in the vapor phase with an oxygen-containing gas, the method of forming a vaporous reaction mixture of the oxygen-containing gas and vapors of naphthalene which comprises passing a stream of the oxygen-containing gas through a Venturi pipe, maintaining a body of naphthalene in molten condition, drawing naphthalene from said body into said stream of oxygen-containing gas by the suction created by said stream in passing through said Venturi pipe and forming a vaporous reaction mixture, maintaining the surface level of said body substantially constant at a point not substantially above the point at which said naphthalene is introduced into said stream of oxygen-containing gas, and maintaining a pressure on said body of naphthalene substantially corresponding with the pressure of the resulting vaporous reaction mixture.

6. In the conversion of a normally solid organic vaporizable substance to partial oxidation products by catalytic oxidation in the vapor phase with air, the method of forming a vaporous reaction mixture of air and vapors of said substance which comprises passing a stream of air through a Venturi pipe, maintaining a body of said substance in molten condition, drawing said substance from said body into said stream of air by the suction created by said stream in passing through said Venturi pipe and supplying heat to the resulting mixture, thereby forming a vaporous reaction mixture, maintaining the surface level of said body substantially constant at a point not substantially above the point at which said material is introduced into said stream of air, and maintaining said substance at substantially the pressure of the resulting vaporous reaction mixture.

7. In the conversion of naphthalene to phthalic anhydride by catalytic oxidation with air, the method of forming a vaporous reaction mixture of naphthalene vapor and air which comprises passing a stream of heated air through a Venturi pipe, drawing molten naphthalene from a body thereof into said air stream by the suction created by said air stream in passing through said Venturi pipe, thereby forming a vaporous reaction mixture, maintaining the surface level of said body of molten naphthalene substantially constant at a point not substantially above the point at which said naphthalene is introduced into said air stream, and maintaining a pressure on said body of naphthalene substantially corresponding with the pressure of the resulting vaporous reaction mixture.

8. In the conversion of naphthalene to phthalic anhydride by catalytic oxidation with air, the method of forming a vaporous reaction mixture of naphthalene vapor and air which comprises passing a stream of air at a temperature of about 150° to about 160° C. through a Venturi pipe, providing a body of molten naphthalene at a temperature of about 130° C., introducing naphthalene from said body into the throat of said Venturi pipe, thereby forming a vaporous reaction mixture, maintaining the surface level of said body of naphthalene at substantially the level of said point of introduction of naphthalene into said Venturi pipe, and maintaining a pressure on the surface of said body of naphthalene substantially corresponding with the pressure of the resulting vaporous reaction mixture.

GUY W. TALBERT.
JOHN D. KERR.